United States Patent
Randjelovic

(10) Patent No.: US 10,440,541 B2
(45) Date of Patent: Oct. 8, 2019

(54) BEACON HAVING MULTIPLE COMMUNICATION INTERFACES

(71) Applicant: The Swatch Group Research and Development Ltd, Marin (CH)

(72) Inventor: Zoran Randjelovic, Corcelles (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/328,789

(22) PCT Filed: Jul. 21, 2015

(86) PCT No.: PCT/EP2015/066611
§ 371 (c)(1),
(2) Date: Jan. 24, 2017

(87) PCT Pub. No.: WO2016/012430
PCT Pub. Date: Jan. 28, 2016

(65) Prior Publication Data
US 2017/0230782 A1    Aug. 10, 2017

(30) Foreign Application Priority Data

Jul. 25, 2014 (EP) .................................... 14178632

(51) Int. Cl.
*H04B 5/00* (2006.01)
*H04W 4/80* (2018.01)
*H04W 88/10* (2009.01)
*G06Q 30/02* (2012.01)

(52) U.S. Cl.
CPC .......... *H04W 4/80* (2018.02); *G06Q 30/0267* (2013.01); *H04W 88/10* (2013.01)

(58) Field of Classification Search
CPC combination set(s) only.
See application file for complete search history.

(56) References Cited

U.S. PATENT DOCUMENTS

| 8,190,885 B2 * | 5/2012 | Obereiner ............. H04L 9/0844 713/156 |
| 8,688,147 B2 | 4/2014 | Nguyen et al. |
| 9,369,008 B2 * | 6/2016 | Ollikainen .............. H02J 17/00 |
| 9,425,865 B2 * | 8/2016 | Lee ....................... H04B 5/0081 |
| 2003/0058086 A1 * | 3/2003 | Hara ..................... B60R 25/245 340/425.5 |
| 2005/0289477 A1 * | 12/2005 | Christensen ........ G06F 3/03543 715/771 |

(Continued)

OTHER PUBLICATIONS

International Search Report dated Sep. 17, 2015 in PCT/EP2015/066611 filed Jul. 21, 2015.

(Continued)

*Primary Examiner* — Cindy Trandai
(74) *Attorney, Agent, or Firm* — Oblon, McClelland, Maier & Neustadt, L.L.P.

(57) ABSTRACT

A communication beacon including a calculation unit associated with a memory unit for data backup and with a clock circuit and a communication circuit, the beacon being supplied with power by a power supply unit. The communication circuit includes a first interface unit using a first protocol, at least one second interface unit using a second protocol, and an antenna connected to each of the interface units.

16 Claims, 4 Drawing Sheets

(56) References Cited

U.S. PATENT DOCUMENTS

| | | | |
|---|---|---|---|
| 2008/0132167 A1* | 6/2008 | Bent | H04W 4/02 455/41.2 |
| 2009/0111378 A1* | 4/2009 | Sheynman | H04W 8/005 455/41.1 |
| 2009/0144550 A1* | 6/2009 | Arunan | H04L 63/068 713/171 |
| 2009/0171786 A1 | 7/2009 | Kuo et al. | |
| 2010/0068996 A1* | 3/2010 | Haartsen | H04B 5/0025 455/41.1 |
| 2010/0127821 A1* | 5/2010 | Jones | G07C 9/00309 340/5.2 |
| 2010/0318712 A1* | 12/2010 | Boldyrev | G06F 9/44573 710/308 |
| 2011/0127845 A1* | 6/2011 | Walley | H02J 5/005 307/104 |
| 2011/0158284 A1* | 6/2011 | Goto | A61B 5/0008 374/163 |
| 2013/0109412 A1 | 5/2013 | Nguyen et al. | |
| 2013/0181539 A1* | 7/2013 | Muratov | H01F 38/14 307/104 |
| 2013/0229690 A1* | 9/2013 | Sumita | H04N 1/00127 358/1.15 |
| 2014/0113560 A1* | 4/2014 | Graube | H04B 7/26 455/41.2 |
| 2014/0129338 A1 | 5/2014 | Nguyen et al. | |
| 2014/0135042 A1* | 5/2014 | Buchheim | G01S 1/68 455/456.6 |
| 2014/0307708 A1* | 10/2014 | Son | H04W 36/0055 370/331 |
| 2015/0038172 A1* | 2/2015 | Sengupta | H04W 4/06 455/456.3 |
| 2015/0039269 A1* | 2/2015 | Mejegard | G06Q 10/06 702/182 |
| 2015/0284231 A1* | 10/2015 | Grant | B66F 17/006 182/19 |
| 2015/0326058 A1* | 11/2015 | Chu | H02J 7/025 320/108 |
| 2016/0174022 A1* | 6/2016 | Nhu | H04W 4/70 455/41.2 |
| 2016/0182128 A1* | 6/2016 | Blangy | H04B 5/0056 340/539.19 |

OTHER PUBLICATIONS

Tony Shore, "Ad-Pod-Plus System" [Retrieved from the Internet: https://www.youtube.com/watch?v=PBdK4dEzZRg], XP054975666, Apr. 10, 2013, 1 Page.

Anwar Craven, "Ad-pods Product Brochure" [Retrieved from the Internet: http://www.ad-pods.com/downloads/productbrochure.pdf], XP002734269, Feb. 15, 2014, 11 Pages.

International Preliminary Report on Patentability dated Sep. 16, 2016 in PCT/EP2015/066611 (submitting English language translation only).

* cited by examiner

BEACON HAVING MULTIPLE COMMUNICATION INTERFACES

CROSS-REFERENCE TO RELATED APPLICATIONS

This is a National Phase Application in the United States of International Patent Application PCT/EP2015/066611 filed on Jul. 21, 2015 which claims priority on European Patent Application No. 14178632.7 filed on Jul. 25, 2014. The entire disclosures of the above patent applications are hereby incorporated by reference.

The present invention relates to a beacon comprising a microcontroller associated with a memory unit for data backup and with a clock circuit and a communication circuit. This communication circuit comprises an antenna, a first interface using a first protocol and a second interface using a second protocol.

PRIOR ART

There are known beacons 1, i.e., electronic devices that supply their own power through a power supply 2 comprising a microcontroller 3 associated with a memory unit 4 for data backup and with a clock circuit 5 and a communication circuit 6 using a communication protocol as can be seen in FIG. 1.

Via their communication circuit, these beacons make it possible to broadcast messages to mobile terminals such as mobile telephones, tablets or computers. These mobile terminals are therefore compatible with the communication protocol of the beacon.

The messages sent can take the form of advertisements or points of interest. For example, a beacon located in a department store will send, to mobile terminals that have an application dedicated to said department store, messages indicating to consumers the last-minute offers currently available in the department store. In another example, a beacon located in an airport area will be able to provide consumers with information indicating delays to particular flights or provide arriving passengers with temperature and humidity information.

The communication protocol usually used is the Bluetooth protocol. This Bluetooth protocol actually defines 3 classes of transmitters offering different ranges depending on their transmission power, running from 1 mW to 100 mW for a range D running from 10 m to 100 m respectively.

However, one disadvantage of this Bluetooth protocol is that it is by nature not secure.

As this Bluetooth protocol is not secure, it may be necessary to use another protocol to perform an exchange of confidential elements, such as an encryption key that will then be used to encrypt the communication using the Bluetooth protocol.

Furthermore, the Bluetooth protocol's range of several meters makes it possible for data to be intercepted by an unwanted third-party device.

SUMMARY OF THE INVENTION

The aim of the invention is to provide a communication beacon that can be programmed or configured in a secure manner while being capable of sending data to a plurality of mobile terminals.

To that end, the invention relates to a communication beacon comprising a microcontroller associated with a memory unit for data backup and with a clock circuit and a communication circuit, said beacon being supplied with power by a power supply unit, wherein said communication circuit comprises a first interface unit using a first protocol, at least one second interface unit using a second protocol and an antenna connected to each of the interface units, the first protocol being used to receive data whereas the second protocol is used to send data.

In a first advantageous embodiment, the first protocol is a protocol of which the range is less than 1 meter.

In a second advantageous embodiment, the second protocol is a protocol of which the range is greater than 1 meter.

In a third advantageous embodiment, the first protocol is a near field communication protocol.

In a fourth advantageous embodiment, the second protocol is a Bluetooth™ communication protocol.

In a fifth advantageous embodiment, the first protocol used by the first interface unit also allows the transmission of data.

In a sixth advantageous embodiment, the beacon further comprises at least one sensor providing data representative of a physical quantity, these data representative of a physical quantity being broadcast by the second interface unit.

In another advantageous embodiment, the sensor is a location sensor.

In another advantageous embodiment, data items originating from said at least one sensor are recorded in the memory unit of the beacon.

In another advantageous embodiment, data can be downloaded by the first interface unit and stored in the memory unit.

In another advantageous embodiment, the first interface unit is connected to a first antenna and the second interface unit is connected to a second antenna.

In another advantageous embodiment, the beacon is provided with an energy recovery system for supplying said beacon with power.

In another advantageous embodiment, the first interface unit is used as an energy recovery system for supplying said beacon with power.

In another advantageous embodiment, the beacon further comprises a third interface unit using a third protocol.

In another advantageous embodiment, the third protocol is a protocol of which the range is greater than the range of the second protocol.

In another advantageous embodiment, the third protocol enables communication with other beacons of which the communication circuit also comprises a third interface unit using a third protocol so as to create a network between these beacons.

BRIEF DESCRIPTION OF THE FIGURES

The aims, advantages and features of the present invention will become more clearly apparent from the following detailed description of at least one embodiment of the invention given solely as a non-restrictive example and illustrated by the accompanying drawings in which.

DETAILED DESCRIPTION

Figure 1:
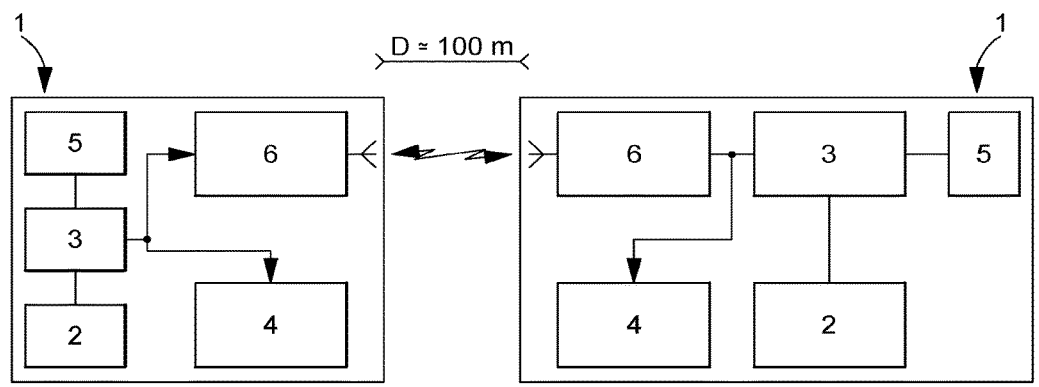
FIG. 1 is a diagrammatic representation of a beacon according to the prior art.
Figure 2:
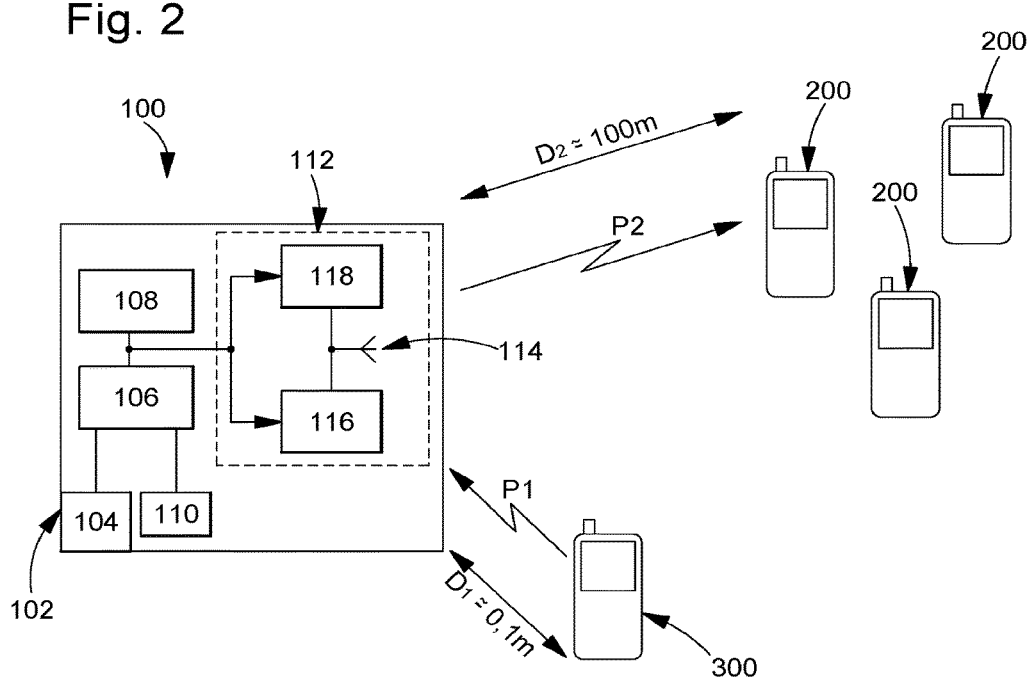
FIG. 2 is a diagrammatic representation of a beacon according to the invention.

FIG. 2 shows a beacon 100 according to the present invention. This beacon 100 takes the form of a housing 102 in which an electronic device is placed. This electronic device is supplied with power by a power supply unit 104. This power supply unit 104 can be a battery or an accumulator or an autonomous unit such as a solar cell. The advantage of such an autonomous unit is that the latter is independent as regards energy The electronic device has a calculation unit or microcontroller 106 associated with a memory unit 108. This memory unit 108 is used to store data and can be a non-volatile memory using flash technology (NOR, NAND).

The electronic device also has a clock circuit 110 for timing the beacon 100 and as an accurate time base for recording data.

The electronic device also has a communication circuit 112 comprising at least one antenna 114 for communication with the exterior. This communication circuit 112 also enables data to be sent to dedicated devices 200 such as mobile telephones, tablets, computers or watches.

This communication circuit 112 thus makes it possible to receive and to transmit configuration data and information data capable of being stored in the memory unit 108.

The configuration data can be the transmission frequency of the beacon or consumption parameters while the information data can be data such as location data or alert data related to specific applications.

Advantageously according to the invention, the communication circuit 112 comprises a first interface unit 116 and at least one second interface unit 118, the first interface unit 116 operating in accordance with a first protocol P1 and the second interface unit 118 operating in accordance with a second protocol P2.

Figure 5:
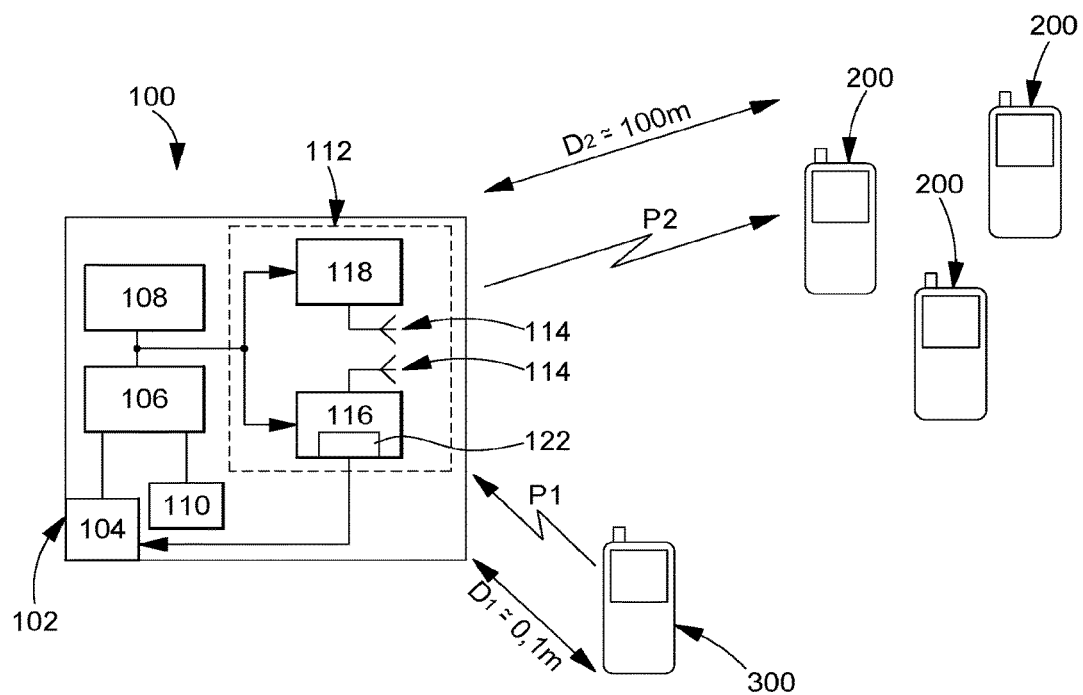
FIG. 5 is a diagrammatic representation of a beacon having two antennas and an energy recovery system.

In a first embodiment, the first interface unit 116 using the first protocol P1 is used to receive data whereas the second interface unit 118 using the second protocol P2 is used to transmit information. It can therefore be understood that the first interface unit 116 and the second interface unit 118 share the same antenna 114 but it is also possible to envisage each interface unit being connected to its own antenna 114 as can be seen in FIG. 5.

This configuration having two interface units makes it possible to have two different protocols for the first interface unit 116 and for the second interface unit 118, i.e. two different protocols for receiving data and transmitting data. Thus, the administrator of this beacon or these beacons will be able to communicate with the beacon(s) 100 by using the first protocol P1 whereas the beacon(s) 100 will communicate with client mobile terminals 200 via the second protocol P2. The administrator will communicate with the beacon 100 via an administrator terminal 300 that can be, for example, a mobile telephone, a tablet, a computer or a watch.

This possibility of having two different protocols for receiving data and for transmitting data allows a secure protocol to be used for receiving data.

According to an advantageous embodiment, the first interface unit 116 uses, as the first protocol P1, the near field communication (NFC) protocol. This NFC protocol is a short-range high-frequency wireless communication technology, allowing the exchange of information between peripherals up to a distance D1 of approximately 10 cm. The second interface unit 118 uses, as the second protocol P2, the Bluetooth protocol, of which the range D2 can run from 10 m to 100 m depending on the signal strength. The P2 protocol can, even more advantageously, be a low-energy protocol such as the Bluetooth low energy (BLE) protocol.

In this embodiment, data reception is made secure by two means.

Firstly, communication is made secure through the low range of a signal using the NFC protocol which prevents said signal from being intercepted by a third party. Secondly, the NFC protocol incorporates coding algorithms directly so that there is no need for an external signal to perform an encryption key exchange in order to encrypt the communication.

Thus the present invention enables the beacon to receive, through an administrator, configuration data or information data securely while being capable of sending data to mobile devices 200 at a range greater than the range of which the NFC protocol is capable.

Consequently, an administrator who wishes to send data to programme the beacon will, firstly, establish a connection with the beacon via the first protocol P1, that is, the near field communication (NFC) protocol. This enables the administrator to send data, in a secure manner, to programme the beacon. For example, these items of data are related to its operation or are related to the information that said beacon 100 broadcasts.

Once these items of data have been received by the beacon 100, the beacon will then use them either to configure itself or to transmit an item of information related to this data. During the transmission of the information related to these items of data, the second interface unit 118 using the second protocol is selected and put into operation.

Figure 3:
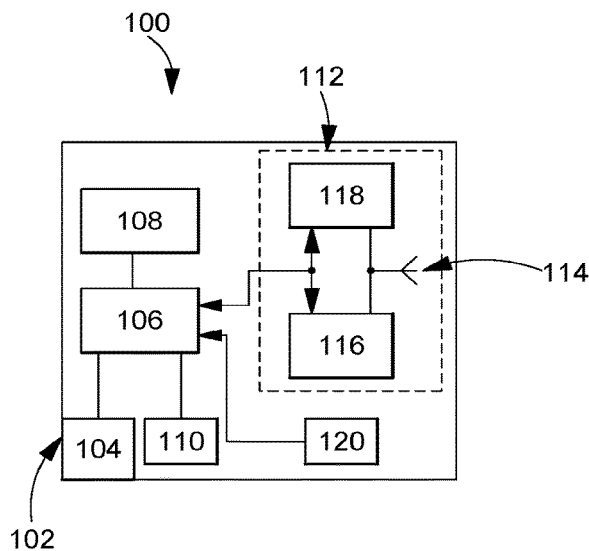
FIG. 3 is a diagrammatic representation of a beacon according to a first variant of the invention.

In a first variant that can be seen in FIG. 3, the beacon 100 further comprises at least one sensor 120 performing measurements at more or less regular intervals, it being possible to configure these intervals. This sensor 120 provides information data that can thus be sent to different mobile devices 200.

For example, the sensor 120 is a pressure sensor that makes it possible to determine an altitude that will then be sent to hikers informing them of the altitude at which said sensor is located. This altitude information can also be used to calibrate a portable altimeter fitted to, for example, a watch.

In another example, the sensor 120 is a location sensor. This location sensor, such as a GPS sensor, provides data concerning a coordinate so that a user knows where he or she is. A network comprising a plurality of these beacons 100 can be used to perform a navigation operation, the user's mobile device 200 being configured to measure the strength of the signal received. The greater the strength of the signal received, the closer the beacon is.

Figure 4:
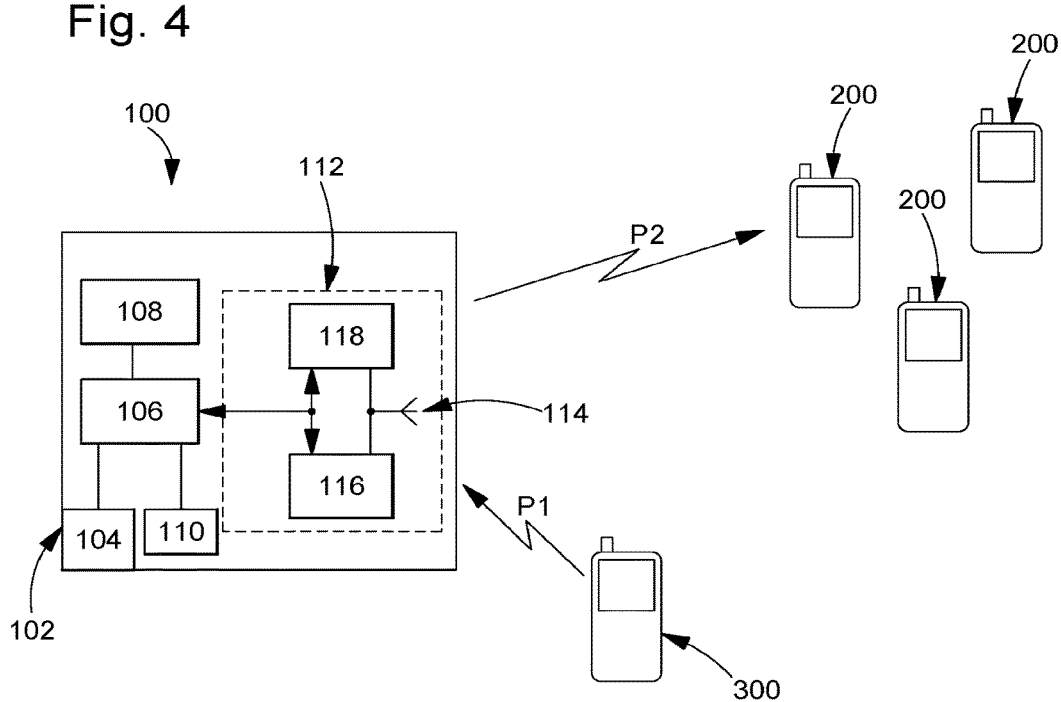
FIG. 4 is a diagrammatic representation of a beacon according to a second embodiment of the invention.

In a second embodiment, which can be seen in FIG. 4, provision is made for the first interface unit 116 to be able to communicate bidirectionally. This is because it is possible to envisage that the first interface unit 116 using the first protocol P1 enabling data to be sent to the beacon 100 can be used to transmit data from the beacon 100 to an administrator terminal 300. This capacity enables data to be transferred securely.

This capacity can be used, for example, to download configuration information from the beacon or to allow tables of data from a sensor to be sent to a central terminal.

In another embodiment, this allows the second interface unit 118 using the P2 protocol, which can be an energy-intensive protocol (Bluetooth), to be used to send only short messages at regular intervals in order to attract the attention of a potential client/consumer/passenger. If said potential client/consumer/passenger is interested in the message received via the P2 protocol, he or she must move closer to the beacon in order to obtain details of the offer or the message via a protocol that is less energy-intensive (for example, the NFC beacon can be passive and activated by the reader located in the mobile telephone).

Figure 6:
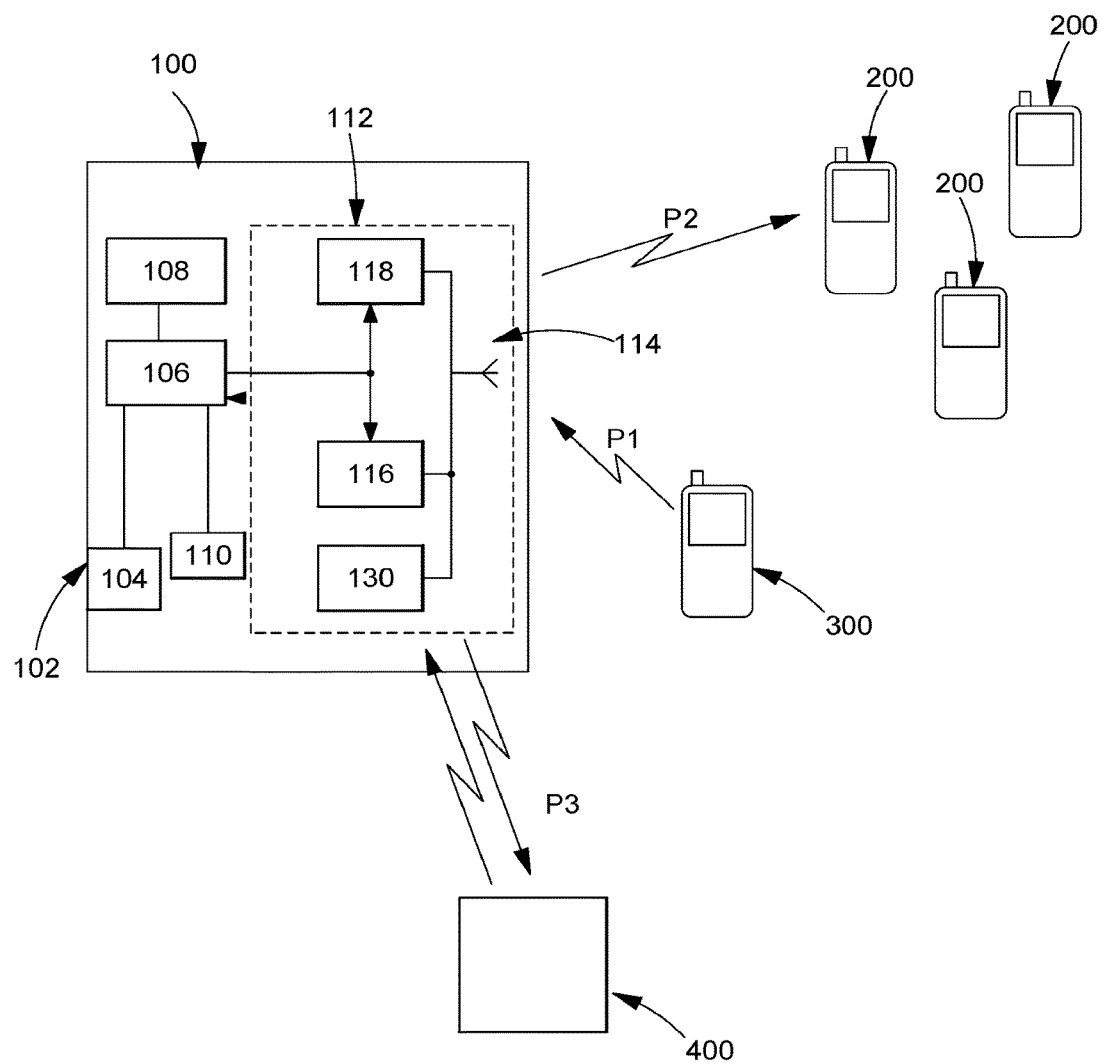
FIG. 6 is a diagrammatic representation of a beacon according to a third embodiment of the invention.

In a third embodiment that can be seen in FIG. 6, the beacon comprises a communication circuit 112 provided with a first interface unit 116, a second interface unit 118 and a third interface unit 130, the first interface unit 116 operating in accordance with a first protocol P1, the second interface unit 118 operating in accordance with a second protocol P2 and the third interface unit 130 operating in accordance with a third protocol P3. In this instance, it is possible to envisage that the first protocol P1 is an NFC-type ultra-short-distance protocol, that the second protocol P2 is a Bluetooth-type short-to-medium-distance protocol and that the third protocol P3 is a GSM- or UMTS-type long-distance protocol.

Such an embodiment allows the third protocol P3 to be used to perform another form of communication. More specifically, this third interface unit 130 operating in accordance with a third protocol P3 advantageously allows communication in a network 400. It will be recalled that the first interface unit 116 using the first protocol P1 is used to receive data such as programming data whereas the second interface unit 118 using the second protocol P2 is used to transmit information. The third interface unit 130 operating in accordance with a third protocol P3 is then used to transmit and/or receive this information over a network 400.

For example, retailer X offers products for sale and is equipped with a beacon according to this third embodiment. The first interface unit 116 using the P1 protocol allows the administrator to programme said beacon with a data item A. The second interface unit 118 using the P2 protocol enables this data item A to be broadcast to all devices compatible with this P2 protocol, while the third interface unit 130 uses the P3 protocol to transmit this data item A to another beacon located in another point of sale of retailer X.

It thus becomes possible to have only one beacon programming operation in order to broadcast a data item A to all the other beacons using this third protocol P3.

Of course, this third interface unit 130 using the P3 protocol can be used for other functions such as positioning. For this, the third interface unit 130 is used to communicate with other beacons using the P3 protocol by sending a signal and waiting for a response. The calculation unit 106 is then able to analyse the strength level of the response received. Indeed, the lower the strength of the response received, the further away the other beacon will be so that it is possible to have a relative position in relation to a plurality of beacons. If these beacons are also provided with a geographic coordinate it is then possible to establish a position. This third interface unit 130 can have its own antenna in order to have a common antenna with the first and second interface units.

It will be understood that various modifications and/or improvements and/or combinations that are obvious to a person skilled in the art can be made to the different embodiments of the invention described above without departing from the scope of the invention defined by the accompanying claims.

Of course, other protocols can be used, such as the ZigBee, Wi-Fi or WiMax protocols.

Furthermore, the beacon according to the present invention can be designed to perform energy harvesting. For this, the beacon is provided with an energy recovery system 122 using vibratory, chemical, solar, wind or thermal energy to supply the beacon with electricity. Likewise, it is possible to envisage that the first interface unit 116 using the first protocol P1 is used to receive data. This is understood to mean that the first interface unit 116 comprises this energy recovery system 122 and that the signals received by this first interface are used by the energy recovery system to supply power to or recharge the beacon as can be seen in FIG. 5.

The invention claimed is:

1. A communication beacon comprising:
processing circuitry associated with a memory for data backup;
a clock circuit;
a communication circuit configured to broadcast data associated with a locality of the communication beacon; and
a local power supply to supply the communication beacon with power,
wherein the communication circuit comprises a first interface using a first protocol, at least one second interface using a second protocol, and at least one shared antenna used by both the first interface and the second interface to communicate, the first protocol being used to receive data to program and/or configure the communication beacon whereas the second protocol is exclusively used to send the broadcast data that is different from the data received to program and/or configure the communication beacon, and use of the first protocol provides at least one security measure not included in the second protocol.

2. The communication beacon according to claim 1, wherein the first protocol is a communication protocol with a communication range that is less than a communication range of the second protocol.

3. The communication beacon according to claim 2, wherein the communication range of the first protocol is less than 1 meter.

4. The communication beacon according to claim 2, wherein the communication range of the second protocol is greater than 1 meter.

5. The communication beacon according to claim 1, wherein the first protocol is a near field communication protocol.

6. The communication beacon according to claim 1, wherein the second protocol is a Bluetooth™ communication protocol.

7. The communication beacon according to claim 1, wherein the first protocol used by the first interface also allows transmission of data.

8. The communication beacon according to claim 1, further comprising at least one sensor providing data representative of a physical quantity, the data representative of a physical quantity being broadcast by the second interface.

9. The communication beacon according to claim 8, wherein the sensor is a location sensor.

10. The communication beacon according to claim 8, wherein data items originating from the at least one sensor are recorded in the memory of the communication beacon.

11. The communication beacon according to claim 1, wherein data can be downloaded by the first interface and stored in the memory.

12. The communication beacon according to claim 1, further comprising an energy recovery system to supply the communication beacon with power.

13. The communication beacon according to claim 12, wherein the first interface is used as an energy recovery system to supply the communication beacon with power.

14. The communication beacon according to claim 1, wherein the communication circuit further comprises a third interface using a third protocol.

15. The communication beacon according to claim 14, wherein the third protocol is a communication protocol with a communication range that is greater than the communication range of the second protocol.

16. The communication beacon according to claim 14, wherein the third protocol enables communication with other beacons, and the communication circuit also comprises a third interface using a third protocol to create a network between the other beacons.

* * * * *